United States Patent
Chao (10) Patent No.: US 6,273,623 B1
(45) Date of Patent: Aug. 14, 2001

(54) KEYBOARD ASSEMBLY

(75) Inventor: Shih-Hung Chao, Taipei Hsien (TW)

(73) Assignee: Acer Peripherals, Inc., Taoyuan (TW)

( * ) Notice: Subject to any disclaimer, the term of this patent is extended or adjusted under 35 U.S.C. 154(b) by 0 days.

(21) Appl. No.: 09/348,126

(22) Filed: Jul. 2, 1999

(30) Foreign Application Priority Data

Jul. 7, 1998 (TW) .................................. 87210920

(51) Int. Cl.[7] .......................................... B41J 5/16
(52) U.S. Cl. ................................. 400/472; 400/496
(58) Field of Search ................................ 400/495, 496, 400/490, 472, 491.2, 495.1; 361/680

(56) References Cited

U.S. PATENT DOCUMENTS

| | | | |
|---|---|---|---|
| 3,890,480 | * 6/1975 | Berling et al. | 400/490 |
| 4,225,970 | * 9/1980 | Jaramillo et al. | 455/89 |
| 4,366,463 | * 12/1982 | Barker | 338/69 |
| 4,396,830 | * 8/1983 | Isozaki et al. | 235/145 R |
| 4,421,966 | * 12/1983 | Pounds | 200/309 |
| 5,111,364 | * 5/1992 | Yohimoto et al. | 361/399 |
| 5,114,790 | * 5/1992 | Corbett | 428/408 |
| 5,180,237 | * 1/1993 | Chen | 400/479 |
| 5,612,692 | * 3/1997 | Dugas et al. | 341/22 |
| 5,697,718 | * 12/1997 | Erler et la. | 400/496 |
| 5,810,491 | * 9/1998 | Muller et al. | 400/496 |

FOREIGN PATENT DOCUMENTS

3808567 * 9/1989 (DE) ................................ 400/472

0104956 * 4/1984 (EP) ................................ 400/491.2

* cited by examiner

Primary Examiner—John S. Hilten
Assistant Examiner—Anthony H. Nguyen
(74) Attorney, Agent, or Firm—Ladas & Parry (57) ABSTRACT

The present invention relates a water-resistant structure for keyboard assemblies with enhanced water-resistant ability. A keyboard hood is provided with a plurality of first slant walls extending toward the keyboard base, a keyboard base is provided with a plurality of second slant wall extending toward the keyboard hood and in parallel with the first slant walls, and an elastic water-resistant sheet is provided with upward-extending slanted edges sandwiched between the first and the second slant wall so as to form a water-resistant structure when the keyboard assembly has been fabricated. The keyboard base is fastened to the keyboard hood by fastening screws passing through holes formed in the centers of bosses in the keyboard base and screwed into holes in protrusion portions formed as part of the keyboard hood. Step-shaped sections are formed near the tip ends of the protrusion portions so as to form a tight water-proof seal between the keyboard hood and the base when the tip ends are assembled into contact with the base. Plural pairs of first parallel ribs are formed on the base, and the elastic water-resistant sheet is shaped so that it can be deeply embedded into the first slots formed between each pair of the first ribs and can cover the ribs and the keyboard base when the keyboard assembly has been fabricated. A plurality of second ribs are formed on the keyboard hood, which, when the keyboard assembly is fabricated, are deeply embedded into second slots formed in the water-resistant sheet.

3 Claims, 9 Drawing Sheets

KEYBOARD ASSEMBLY

FIELD OF THE INVENTION

The present invention relates to a keyboard water-resistant structure, in particular, to a water-resistant structure for keyboard assemblies with enhanced water-resistant ability.

DESCRIPTION OF THE PRIOR ART

Figure 1:
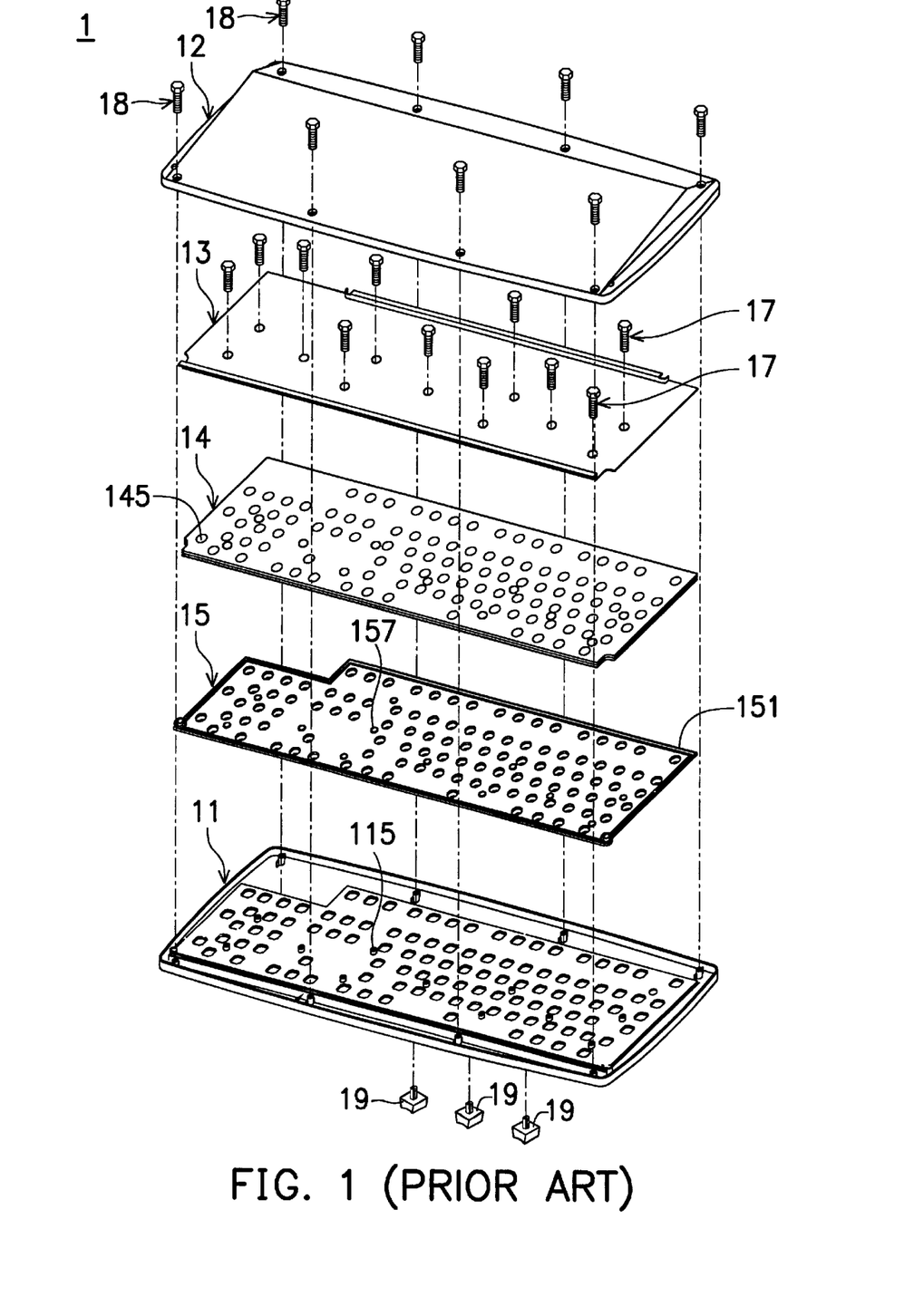
FIG. 1 is an exploded perspective view showing the structure of a keyboard assembly according to the prior art.

FIG. 1 is an exploded perspective view showing the structure of a keyboard assembly 1. The keyboard assembly 1 comprises a keyboard hood 11, a plurality of key caps 19, an elastic water-resistant sheet 15, a circuit membrane 14, a metal plate 13, and a keyboard base 12. The water-resistant sheet 15 is made of rubber, and an endless flange 151 is integrally formed on its peripheral rim. Furthermore, plural elastic protrusions 155 are formed on the elastic water-resistant sheet 15, and plural through holes 157 are formed in the elastic water-resistant sheet 15.

Figure 2:
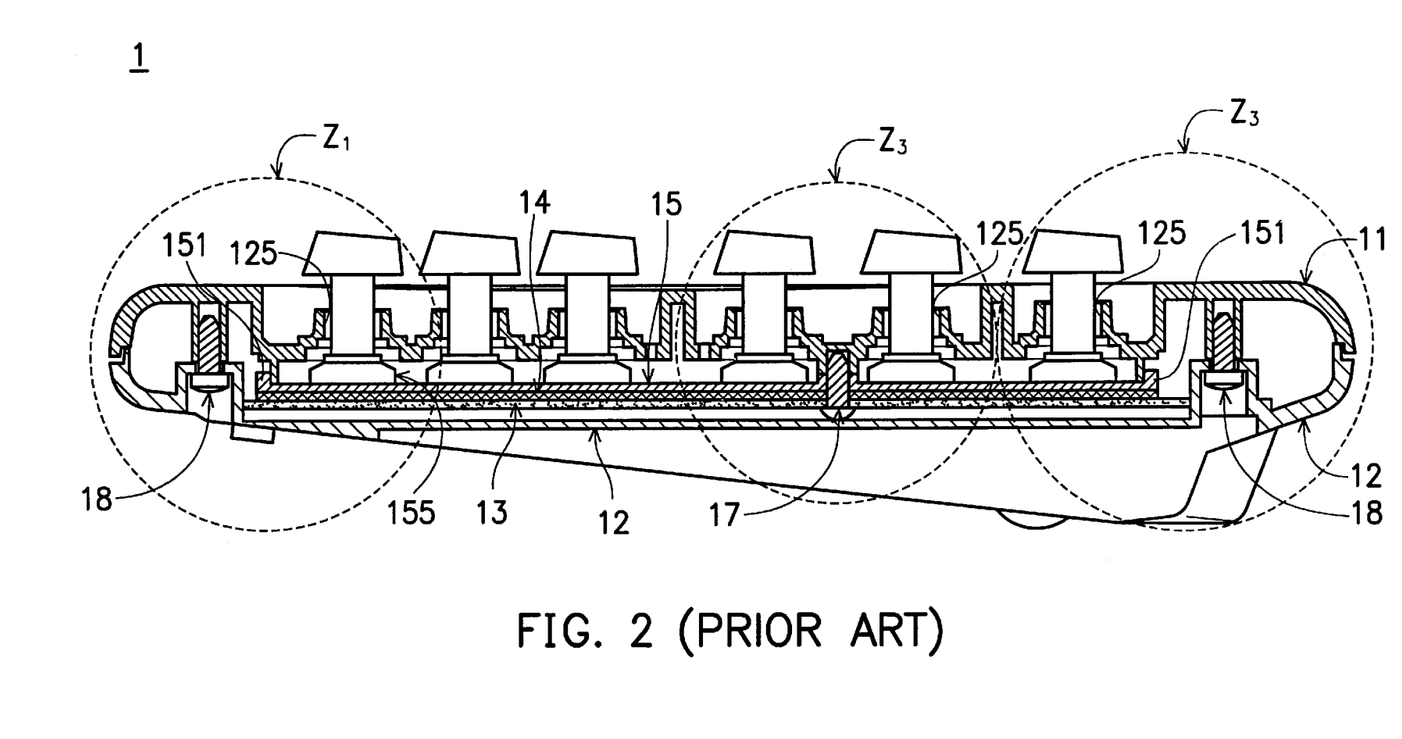
FIG. 2 is a cross-sectional view showing the internal structure of the fabricated keyboard assembly 1 shown in FIG. 1.
Figure 3A:
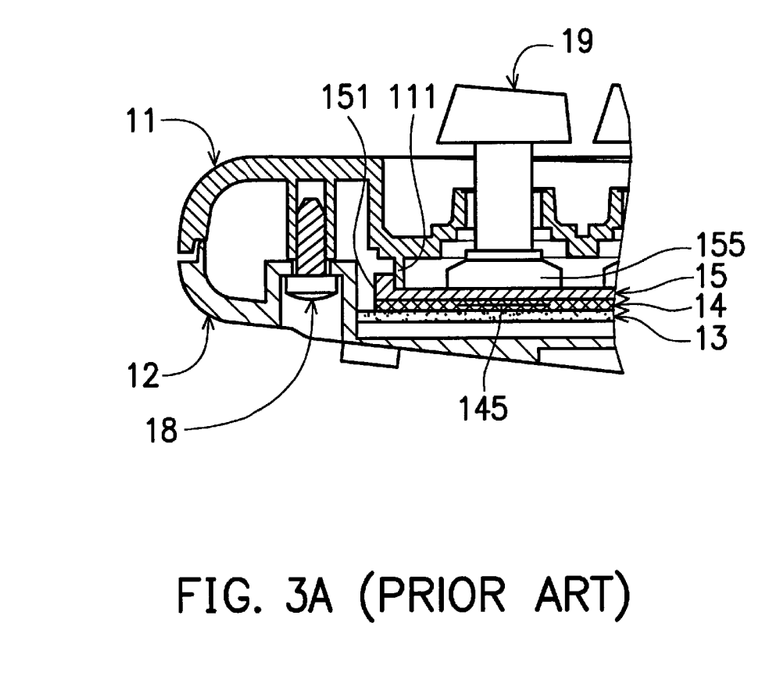
FIGS. 3A and 3B are enlarged cross-sectional views respectively showing the portions $Z_1$, and $Z_2$ in FIG. 2.
Figure 3B:
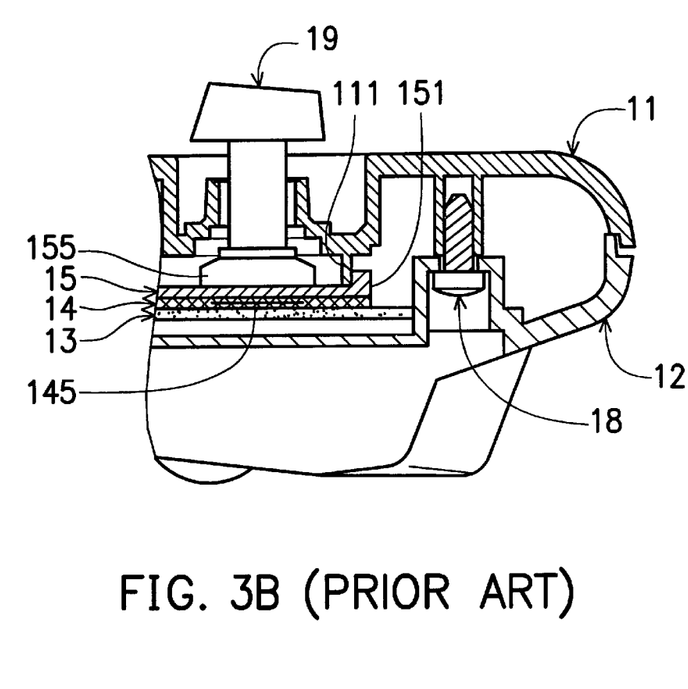
Figure 4:
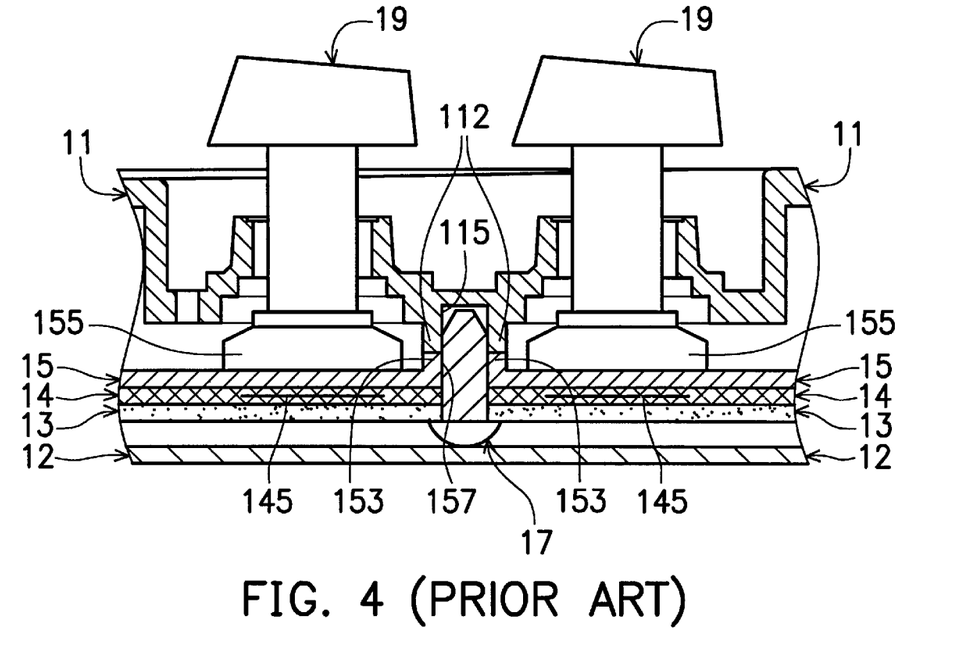
FIG. 4 is an enlarged cross-sectional view showing the portions $Z_3$ in FIG. 2.

FIG. 2 is a cross-sectional view showing the internal structure of the fabricated keyboard assembly 1 shown in FIG. 1. The metal plate 13 is affixed on the keyboard hood 11 by means of bolts 17 and the keyboard base 12 is affixed on the keyboard hood 11 with the aid of bolts 18. The water-resistant sheet 15 and the circuit membrane 14 are disposed therebetween. FIGS. 3A, 3B and FIG. 4 are enlarged cross-sectional views respectively showing the portions $Z_1$, $Z_2$, and $Z_3$ in FIG. 2.

As shown in FIGS. 3A and 3B, a downward-extending flange 111 is integrally formed with the keyboard hood 11.

The metal plate 13 strongly urges the water-resistant sheet 15 toward the flange 111 while the keyboard base 12 is brought to connect with the keyboard hood 11 by means of the bolts 18. Compared with the water-resistant sheet 15, the downward-extending flange 111 is rigid. Therefore, deformation of the water-resistant sheet 15, which is induced by tight contact between the downward-extending flange 111 and the water-resistant sheet 15, primarily takes place circular flange 153 side. Due to that fastening force is normal to the water-resistant sheet 15; it will cause irregular wrapping of the water-resistant sheet 15 at the portion near the downward-extending flange 111. For that reason, there exists a possibility that water enters the keyboard assembly from the gaps caused by irregular wrapping of the water-resistant sheet 15. Accordingly, the water-resistant sheet 15 will not function as a water-resistant member any more, and it is unable to prevent water from entering the keyboard assembly.

As shown in FIG. 4, a downward-extending flange 112 with a deep hole 115 formed therein is integrally formed with the keyboard 11. A circular flange 153 facing the downward-extending flange 112 is formed on the water-resistant sheet 15. When the keyboard 11 and the keyboard base 12 are fastened together, the downward-extending flange 112 is brought to strongly urge the circular flange 153 that is upheld by the metal plate 13. As described above, the bolts 17 are used for fastening the metal plate 13 with the keyboard hood 11. The fastening forces exerted by the bolts 17 are always normal to the water-resistant sheet 15. Compared with the circular flange 153, the downward-extending flange 112 is rigid. Therefore, deformation induced by tight contact between them will primarily take place on the circular flange 153 side.

Therefore, the fastening force exerted by the bolts 17, which is normal to the water-resistant sheet 15, will cause irregular wrapping of the water-resistant sheet 15 at the portion surrounding the bolts 17. For that reason, it is possible that water enters the keyboard assembly from the gaps caused by the irregular wrapping of the water-resistant sheet 15.

Furthermore, as shown in FIGS. 3A and 3B, it is essential to keep a tight contact between the endless flange 151 and the downward-extending flange 111 so as to prevent water from entering the keyboard assembly. Therefore, a high accuracy in their dimension is required. The same situation happens in the portion of the keyboard assembly shown in FIG. 4.

SUMMARY OF THE INVENTION

It is therefore an object of this invention to provide a keyboard assembly with a water-resistant structure that can strongly prevent water from entering the keyboard assembly.

The keyboard assembly according to this invention is used for inputting data into a computer via keys. The keyboard assembly has a keyboard hood, on which keys are disposed; a circuit membrane disposed within the keyboard assembly, for being actuated by the keys disposed on the keyboard hood; an elastic water-resistant sheet disposed between the keys and the circuit membrane; and a keyboard base fastened to the keyboard hood so as to enclose the water-resistant sheet and the circuit membrane therebetween. The keyboard assembly is characterized in that: the keyboard hood is provided with a plurality of first slant wall extending toward the keyboard base; the keyboard base is provided with a plurality of second slant wall extending toward the keyboard hood and in parallel with the first slant wall; and the elastic water-resistant sheet is provided with upward-extending slant verges sandwiched between the first and the second slant wall so as to form a water-resistant structure when the keyboard assembly has been fabricated.

Furthermore, the keyboard assembly is characterized in that: the keyboard base is fastened to the keyboard hood by fastening screws passing through the through holes formed in the centers of the bosses of the keyboard base; the fastening screws are screwed into holes formed in protrusion portions 219 formed together with the keyboard hood; and step-shaped sections are formed on the tip ends of the protrusion portions 219 so as to form tight water-proof seal between the keyboard hood and the base when the keyboard assembly has been fabricated.

Furthermore, the keyboard assembly is characterized in that: plural pairs of first parallel ribs are formed on the base; the elastic water-resistant sheet is in a shape that it can be deeply embedded into the first slots formed between each pair of the first ribs and can cover the ribs and the keyboard base when the keyboard assembly has been fabricated; and a plurality of second ribs are formed on the keyboard hood, which are deeply embedded into the second slots of the water-resistant sheet when the keyboard assembly has been fabricated.

Furthermore, the keyboard assembly is characterized in that: plural pairs of third ribs are formed on the keyboard hood; a plurality of fourth ribs are formed on the water-resistant sheet; the fourth ribs are in a shape that they can be deeply embedded into the slot formed in each pair of third ribs when the keyboard assembly has been fabricated.

BRIEF DESCRIPTION OF THE DRAWINGS

The present invention can be more fully understood from the following detailed description and preferred embodiment with reference to the accompanying drawings in which.

DETAILED DESCRIPTIONS OF THE PREFERRED EMBODIMENTS

Figure 5A:
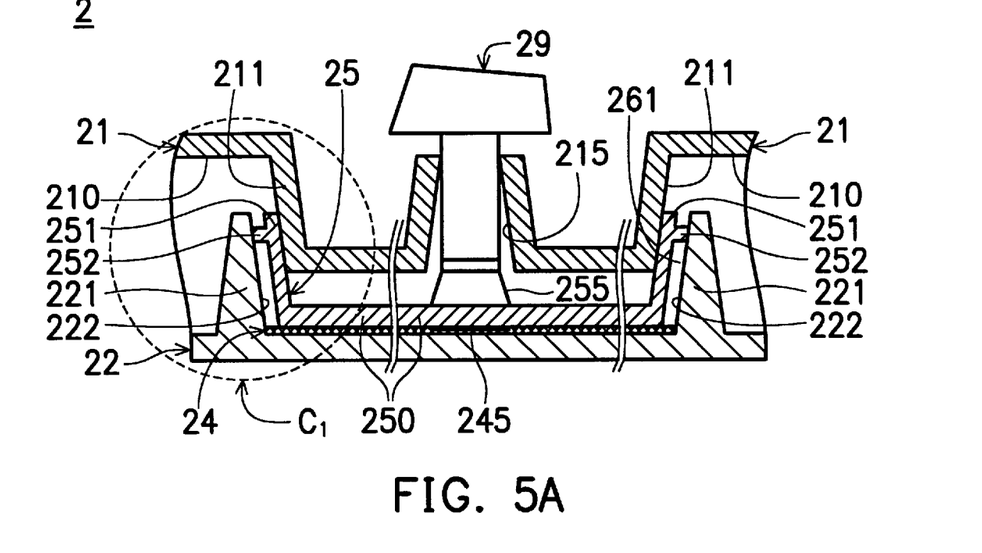
FIG. 5A is a cross-sectional view showing the water-resistant structure of a keyboard according to the first embodiment of this invention.
Figure 5B:
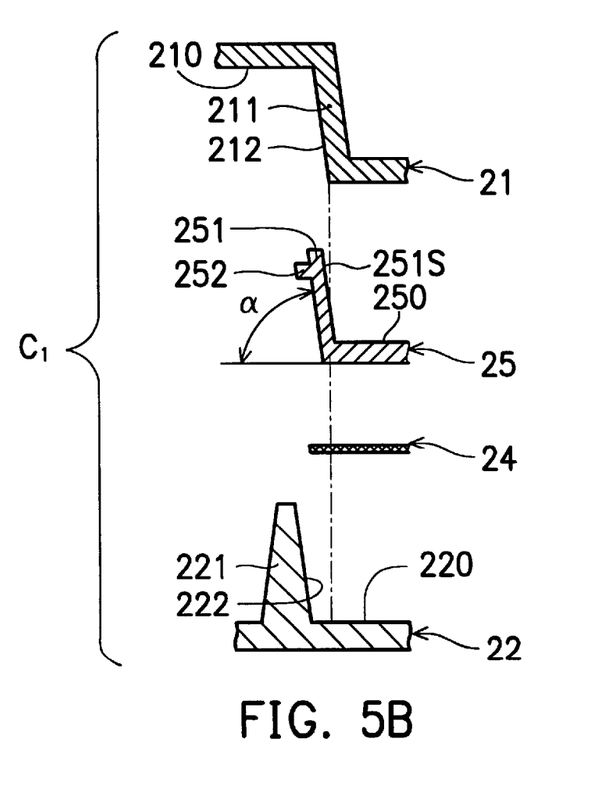
FIG. 5B is an exploded view showing the members of the encircled portion $C_1$ in FIG. 5A.

FIG. 5A is a cross-sectional view showing the water-resistant structure of a keyboard according to the first embodiment of this invention. FIG. 5B is an exploded view showing the members of the encircled portion $C_1$ in FIG. 5A. As shown in FIG. 5A~5B, a keyboard assembly 2 includes (a) a keyboard hood 21, (b) a plurality of key caps 29, (c) a circuit membrane 24, (d) a rubber sheet 25, and (e) a keyboard base 22. These key caps 29 disposed on the keyboard hood 21, and the circuit membrane 24 disposed between the key caps 29 and the circuit membrane 24 for being actuated by the key caps 29. The keyboard base 22 is fastened to the keyboard hood 21 so as to the rubber sheet 25 and the circuit membrane 24 are enclosed between the base 22 and hood 21.

The first slant wall 212 is formed on the keyboard hood 21, and the second slant wall 222 corresponding to the first slant wall 212 is formed on the keyboard base 22 to define a slot-like first receiving space 261 between the first slant wall 212 and the second slant wall 222. The upward-extending circumferential projection 251 is formed along the circumference of the rubber sheet 25, and disposed in the first receiving space 261.

The upward-extending projection 251 comprises the flange 252 which is extending toward the second slant wall 222, so as the total thickness of the flange 252 and the upward-extending projection 251 is larger than the horizontal dimension of the first receiving space 261. Both the first slant wall 212 and the second slant wall 222 press the upward-extending circumferential projection 251 so as to hold it in an substantially upright position. However, it is also a simple modification that the flange 252 is extending toward the first slant wall 212.

Furthermore, as shown in FIG. 5A, a plurality of elastic portions 255, each of which is located at a site above one switch element 245, are formed on the water-resistant sheet 25. Key caps 29 penetrate key cap seats 215 formed in the keyboard hood 21 so as to activate the switch elements 245 when they are pressed down.

When a keyboard base 22 fastened to the keyboard hood 21, the upward-extending circumferential projection 251 of the water-resistant sheet 25 is extending between the second slant wall 222 of the base 22 and the first slant wall 212 of the keyboard hood 21. By this arrangement, the upward-extending circumferential projection 251 of the water-resistant sheet 25 is sandwiched between the slant wall 222 of the base 22 and the slant wall 212 of the keyboard hood 21. Due to that the water-resistant sheet 25 is made of elastic material; irregular wrapping caused by clamping of the slant wall 222 of the base 22 and the slant wall 212 of the keyboard hood 21 so as to hold the upward-extending projection 251 in an substantially upright position. Therefore, the water-resistant sheet 25 can keep a tight contact with the circuit membrane 24, and water is unable to enter the keyboard assembly 2 through the boundary of the water-resistant sheet 25 and the circuit membrane 24.

Figure 6A:
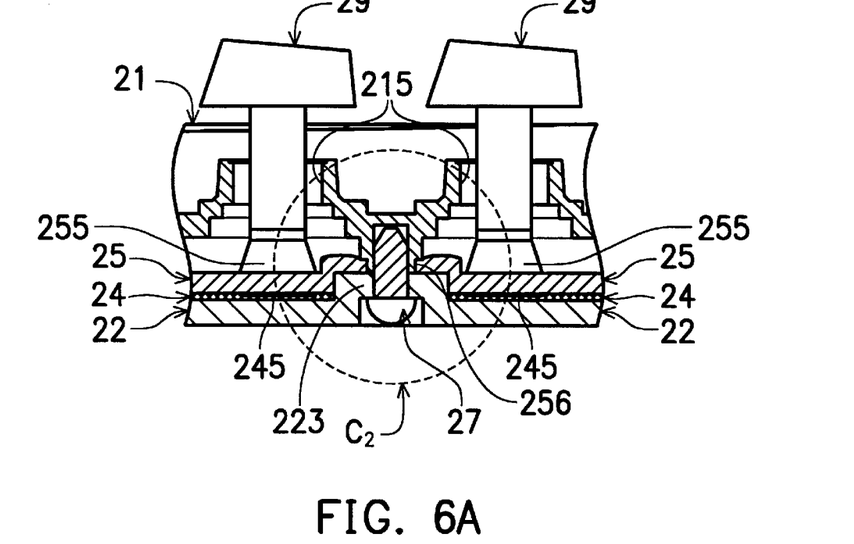
FIG. 6A is a cross-sectional view showing the water-resistant structure of a keyboard according to the second embodiment of this invention.
Figure 6B:
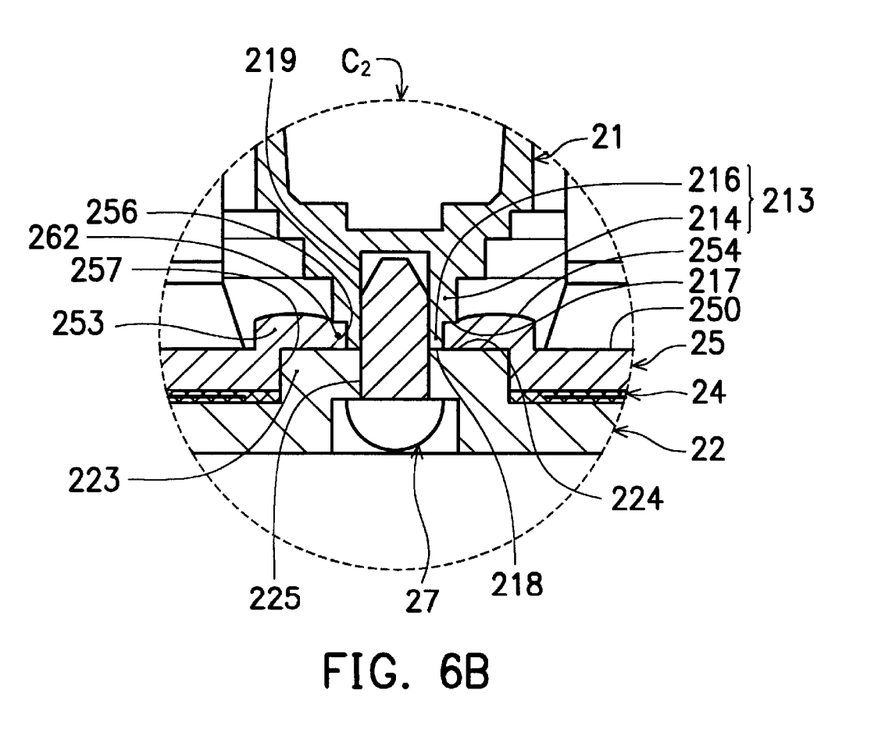
FIG. 6B is an enlarged cross-sectional view showing the members of the encircled portion $C_1$ in FIG. 6A.
Figure 6C:
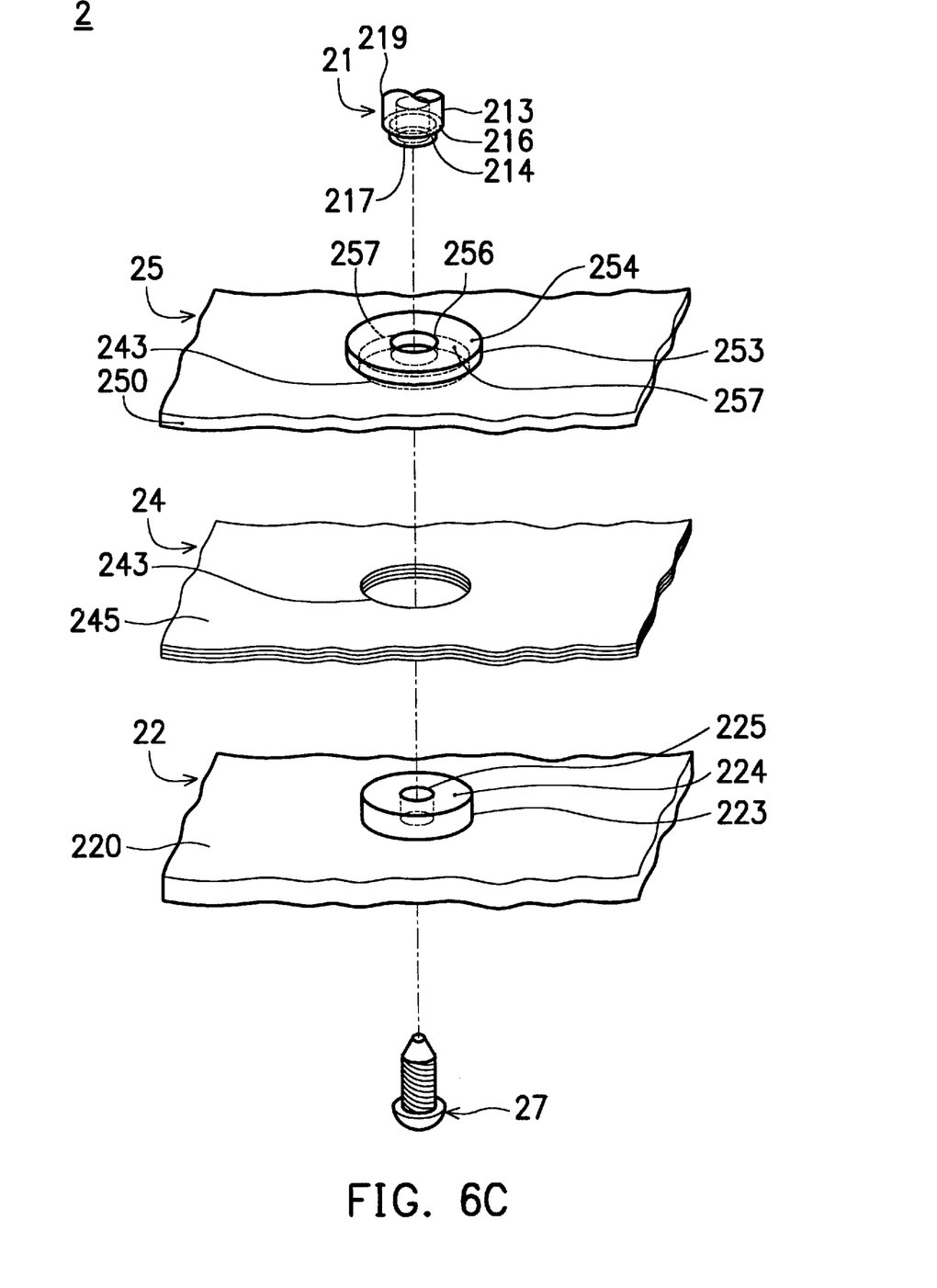
FIG. 6C is an enlarged perspective view showing the members of the encircled portion $C_2$ in FIG. 6B.

FIG. 6A is a cross-sectional view showing the water-resistant structure of a keyboard according to the second embodiment of this invention. This keyboard assembly 6 shown in FIG. 6A a has similar structure as FIG. 5A. FIG. 6B is an enlarged cross-sectional view showing the members of the encircled portion $C_1$ in FIG. 6A. FIG. 6C is an enlarged perspective view showing the members of the encircled portion $C_2$ in FIG. 6B.

As shown in FIG. 6C, the first through hole 225 is formed on the keyboard base 22, and the corresponding second through hole 256 is formed on the rubber sheet 25. Corresponding to the first through hole 225, the protrusion portion 219 is formed on the bottom surface of the keyboard hood 21, and the screw hole 217 is formed in the bottom surface of the protrusion portion 219. The keyboard base 22 can be fastened to the keyboard hood 21 by having the fastening screw 27 passing through the first and the second through holes and screwed into the screw hole.

The protrusion portion 219 is provided with a step-shaped section 213, and the step-shaped section and the keyboard base 22 define the second receiving space 262 when the tip end 216 of the protrusion portion 219 contacts the keyboard base 22, preferably on top surface 224 of the protrusion 223. The edge portion 253 is formed around the second through hole of the rubber sheet 25, and the thickness of the edge portion 253 is larger than the vertical dimension of the second receiving space 262. Therefore, the top surface of the edge portion 253 of the rubber sheet 25 is pressed by the step-shaped section 213 and the bottom surface of the edge portion 253 is pressed by the keyboard base 22.

The inner diameter of the through hole 243 is slightly larger than that of the outer diameter of the protrusion 223 formed on the base 22. As shown in FIGS. 6A and 6B, when the keyboard assembly 2 has been fabricated, a screw 27 is used to engage the keyboard hood 21 and the base 22. The step-shaped section 213 formed together with the keyboard hood 21 urges the edge portion 253 of the through hole 256. Thus, the edge portion 253 of the through hole 256 is pushed downward and a tight water-resistant seal is formed between the keyboard hood 21 and the base to prevent water from entering the keyboard assembly 2. Water coming from the gaps formed between the bolt 27 and the base 22 can be sealed.

Figure 7A:
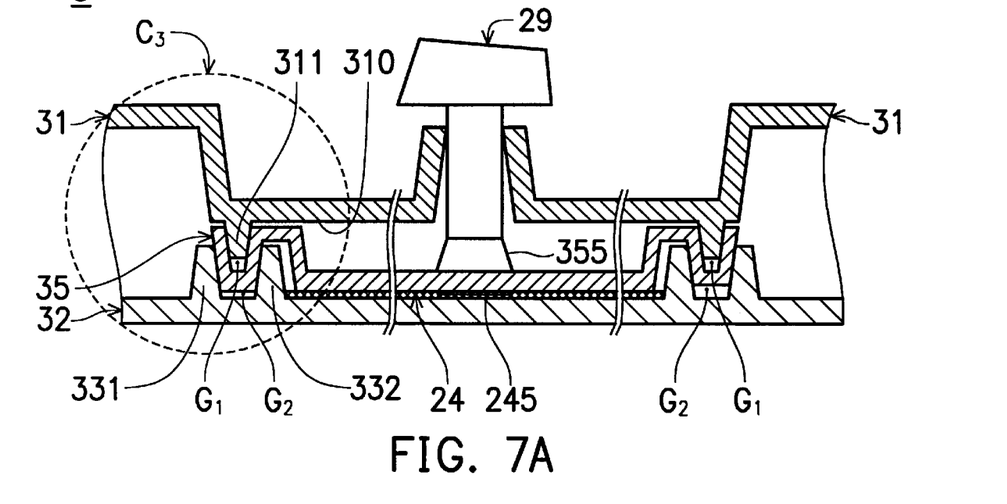
FIG. 7A is a cross-sectional view showing the water-resistant structure of a keyboard according to the third embodiment of this invention.
Figure 7B:
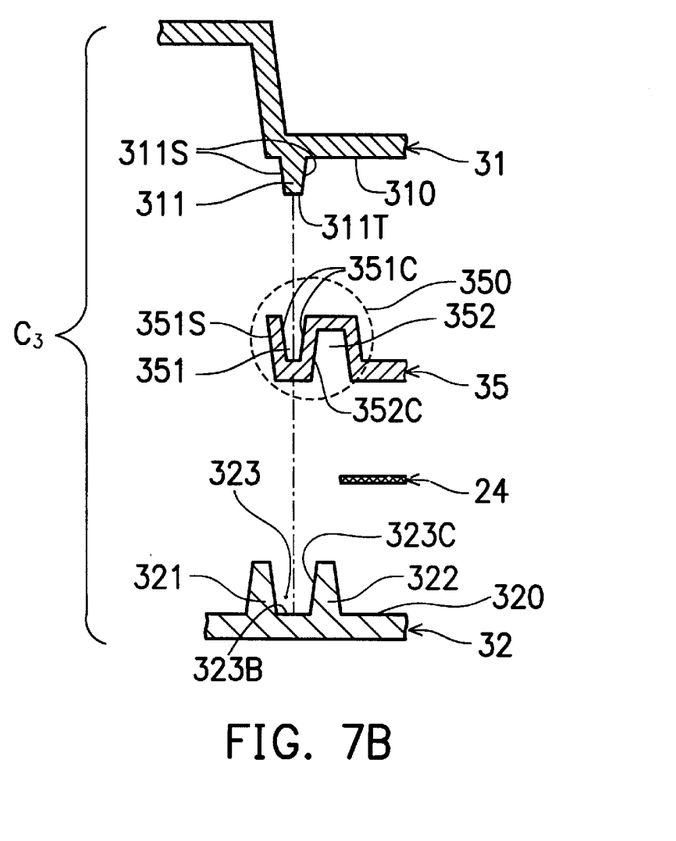
FIG. 7B is an exploded view showing the members of the encircled portion $C_3$ in FIG. 7A.

FIG. 7A is a cross-sectional view showing the water-resistant structure of a keyboard 3 according to the third embodiment of this invention. The keyboard 3 assembly has a similar structure as shown in FIG. 5A. FIG. 7B is an exploded view showing the members of the encircled portion $C_3$ in FIG. 7A.

As shown in FIG. 7B, the receiving slot 323 is formed along a circumference of a top surface of the keyboard base 32, and the protruding rib 311 corresponding to the receiving slot 323 is formed on the bottom surface of the keyboard hood 31. The V-shaped edge comprising 351, 351S and 351C is formed along the circumference of the rubber sheet 35, and is disposed in the receiving slot 323 and pressed by the protruding rib 311. Two spaced ribs 321, 322 are upwardly formed on the surface 320 of the base 32 and the receiving slot 323 is formed therebetween. The end portion 350 (dotted line) of the water-resistant sheet 35 is in a shape that it can be deeply embedded into the receiving slot 323 formed between the two ribs 321, 322 and can cover the rib 322 and the base 32 when the keyboard assembly has been fabricated.

Preferably, the cross-section of the end portion 350 of the water-resistant sheet 35 is shaped like a wave or a corrugated plate. The end portion 350 is formed with a sidewall 351S and two opposite trapezoid slots 351, 352. The space 351 is provided with two sidewalls 351C and the space 352 is provided with a sidewall 352C. A rib 311 is formed on the keyboard hood 31. The rib 311 is deeply embedded into the space 351 of the water-resistant sheet 35 when the keyboard assembly has been fabricated (see FIG. 7A). However, it is a simple modification to make the receiving slot 323 formed along the circumference of the bottom surface of the keyboard hood 31, and the protruding rib 311 corresponding to the receiving slot 323 formed on the top surface of the keyboard base 32.

The sidewalls 351S, 352C of the end portion of the water-resistant sheet 35 are in a tapered form. As the end of the water-resistant sheet 35 is deeply embedded into the slot 323, the sidewalls 351S, 352S push the sidewalls 323C, 323C of the ribs 321. This can enhance the water-resistant effect. Moreover, as shown in FIG. 7A, a gap $G_1$ exists between the water-resistant sheet 35 and the keyboard hood 31; and a gap $G_2$ exists between the water-resistant sheet 35 and the base 32. The gap $G_2$ allows the end of the water-resistant sheet 35 to be embedded into the slot 323 as deep as possible without inducing any wrapping of the water-resistant sheet 35. Similarly, the gap $G_1$ allows the rib 311 to be embedded into the water-resistant sheet 35 as deep as possible. The existence of the above gaps can also enhance the water-resistant capability of the keyboard assembly.

Figure 8A:
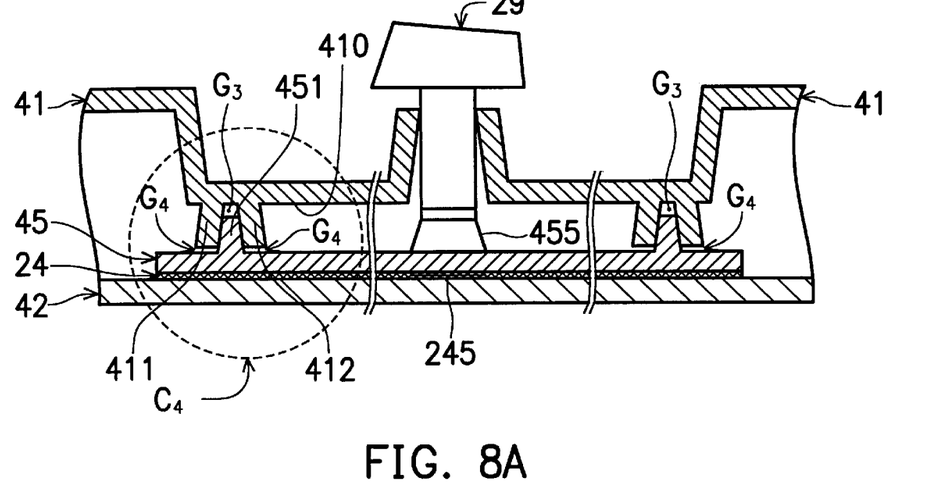
FIG. 8A is a cross-sectional view showing the water-resistant structure of a keyboard according to the fourth embodiment of this invention.
Figure 8B:
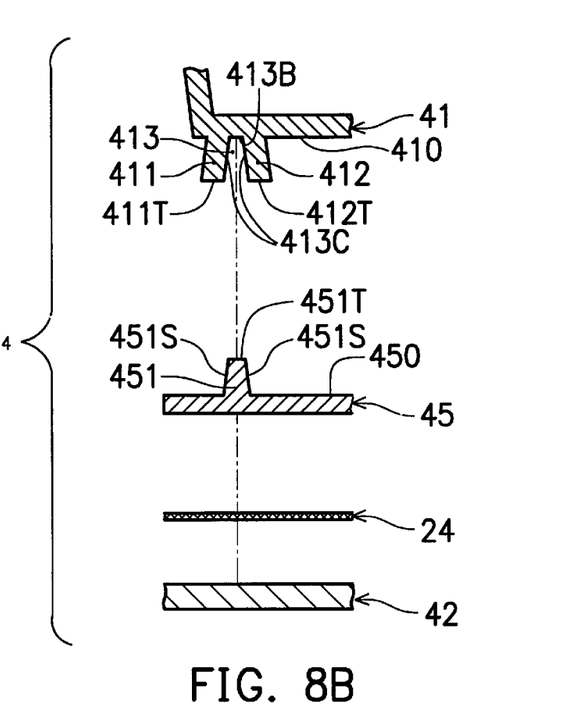
FIG. 8B is an exploded view showing the members of the encircled portion $C_4$ in FIG. 8A.

FIG. 8A is a cross-sectional view showing the water-resistant structure of a keyboard 4 according to the fourth embodiment of this invention. FIG. 8B is an exploded view showing the members of the encircled portion $C_4$ in FIG. 8A. As shown in FIG. 8B, the receiving slot 413 is formed along the circumference of a bottom surface of the keyboard hood 41; and the circumferential protrusion 451 corresponding to the receiving slot 413 is formed on the top surface of the rubber sheet 45. The circumferential protrusion 451 is disposed in the receiving slot 413 and pressed by the keyboard base 42 from the bottom surface. Two spaced ribs 411, 412 are formed on the bottom surface 410 of the keyboard hood 41 and the receiving slot 413 provided with two sidewalls 413C and a bottom surface 413B is formed therebetween. A rib 451 provided with a top surface 451T and two sidewalls 451S is upwardly formed on the surface 450 of the water-resistant sheet 45. The rib 451 is in a shape that it can be deeply embedded into the receiving slot 413 when the keyboard assembly has been fabricated (see FIG. 8A).

As the water-resistant sheet 45 is clamped by the keyboard hood 41 and the base 42, a gap $G_3$ exists between top surface 451T of the water-resistant sheet 45 and the bottom surface 413B of the keyboard hood 41, and two gaps $G_4$ exist between the water-resistant sheet 45 and the top surfaces 411T of the ribs 411, 412. The gap $G_3$ allows the rib 451 to be embedded into the receiving slot 413 as deep as possible. The gap $G_4$ can avoid wrapping of the water-resistant sheet 45 that receives a normal force during assembling operation. However, it is a simple modification to make the receiving slot 413 formed along the circumference of the top surface of the water-resistant sheet 45, and the protruding rib 451 corresponding to the receiving slot 413 formed on the bottom surface of the keyboard base 32.

What is claimed is:

1. A keyboard assembly comprising a keyboard hood, a plurality of key caps disposed on the keyboard hood, a circuit membrane actuated by the key caps, a rubber sheet disposed between the key caps and the circuit membrane, and a keyboard base fastened to the keyboard hood so as to enclose the rubber sheet and the circuit membrane therebetween, the keyboard assembly further comprising:

a first slant wall formed on the keyboard hood;

a second slant wall formed on the keyboard base and corresponding to the first slant wall to define a slot-like first receiving space between the first slant wall and the second slant wall; and a substantially vertically extending circumferential rubber sheet wall formed along a circumference of the rubber sheet, the circumferential rubber sheet wall being disposed in the first receiving space and pressed by both the first and the second slant walls so as to hold the circumferential rubber sheet wall in a substantially upright position and to form a watertight seal at the boundary of the rubber sheet.

2. The keyboard assembly as claimed in claim 1, wherein the keyboard assembly further comprises a substantially horizontally extending flange formed on the circumferential rubber sheet wall, so that a total thickness of the flange and the circumferential rubber sheet is larger than the dimension of the first receiving space.

3. The keyboard assembly as claimed in claim 1, wherein the circumferential rubber sheet wall comprises at least an upward-opening slot and a downward-opening slot, so that the first slant wall is received in the upward-opening slot, and the second slant wall is received in the downward-opening slot.

* * * * *